Mar. 27, 1923.

F. J. YOUNGER

SANITARY DISPENSING APPARATUS

Filed Nov. 23, 1921 5 sheets-sheet 4

1,449,571

INVENTOR
Frank J. Younger.

BY Fred J. Dieterich
ATTORNEYS

Mar. 27, 1923.

F. J. YOUNGER 1,449,571

SANITARY DISPENSING APPARATUS

Filed Nov. 23, 1921          5 sheets-sheet 5

INVENTOR
*Frank J. Younger.*
BY
*Fred J. Outerech*
ATTORNEYS

Patented Mar. 27, 1923.

1,449,571

UNITED STATES PATENT OFFICE.

FRANK J. YOUNGER, OF WALLACE, CALIFORNIA, ASSIGNOR OF TWENTY-SIX ONE-HUNDREDTHS TO MORITZ HEINRICH ROEBER AND FIFTEEN ONE-HUNDREDTHS TO JOE CALCATERRA, BOTH OF WALLACE, CALIFORNIA.

SANITARY DISPENSING APPARATUS.

Application filed November 23, 1921. Serial No. 517,286.

*To all whom it may concern:*

Be it known that I, FRANK J. YOUNGER, a declarant citizen of the United States (formerly a subject of Germany), residing at Wallace, in the county of Calaveras and State of California, have invented a new and Improved Sanitary Dispensing Apparatus, of which the following is a specification.

My invention has reference to improvements in sanitary dispensing apparatus or appliances of that type more especially designed for dispensing granulated sugar and other like commodities in an absolutely sanitary manner, without waste, and which is particularly well adapted for use in connection with dining service.

Primarily, my present invention has for its object to produce certain improvements in the dispensing apparatus disclosed in my Patent #1,303,141, dated May 6, 1919, whereby to provide for more conveniently handling said apparatus and for positively controlling the valve devices, the movement of which regulate the discharge of a desired predetermined quantity of granulated sugar or other like articles to be dispensed, for example, a heaping teaspoonful at the time, provision being also present in my improved construction of dispensing apparatus, whereby any amount of the commodity contained within the apparatus can be dispensed, at the will of the user.

In my patented dispensing apparatus mentioned, the body or container, whose contents are dispensed at the will of the operator, is adapted for being grasped by the hands and moved to the desired place to dispense the material, onto a dish or into a cup or other like receiver.

The essential object of my present invention is to provide a dispensing apparatus adapted for being supported, at a convenient position, on the table or other service surface, whose valve devices, that control the outfeed of the material, are designed for one hand as the other hand places the cup or other receiver in position, under the material holding body of the apparatus, for gathering the dispensed commodity.

A still further object of my invention, is the provision, in a dispensing apparatus of the general type mentioned, of means operable by the fingers that manipulate or shift the control valves adapted to prevent the material lodging between and clogging the discharge control valve, and also prevent any tendency of the material from bridging or clogging its flow past the control valves, as they are shifted to produce the material dispensing operation.

With the above and other objects in view and other minor objects that will hereinafter become apparent, as the detailed description of my dispensing apparatus is considered, my present invention comprehends an improved food commodity dispensing apparatus or table appliance, in which is embodied certain novel features of construction and combination of parts, all of which will be fully stated in the following detailed description, specifically pointed out in the appended claims and illustrated in the accompanying drawings, in which:—

Figure 3 is a view similar to Figure 2, the opposing valves being positioned for dispensing a charge of the material through the discharging outlet.

Figure 4 is a cross section of the upper part of the apparatus, the filling valve devices being shown adjusted to a position for permitting the filling of the body or holder.

Figure 5 is a cross section and

Figures 8 and 8ª illustrate respectively, a cross section and an inverted plan view of the screw cap or cover hereinafter specifically referred to.

Figure 9 is a perspective view of the plunger tube and its attached cutoff valve.

Figure 10 is a perspective view of the plunger rod with the discharge control valve connected therewith.

Figure 11 is a detail vertical section of the cutoff valve and the tubular stem to which the valve is attached and the winged finger grip hereinafter mentioned.

Figure 13 is a detail section and

Figure 16 is an enlarged plan view of the circular base portion thereof.

Figure 17 is a detail view of the key hole slot connection hereinafter specifically referred to.

In the practical development of my present construction of table accessory for dispensing food commodities and which, in its generic nature, embodies a container having a bottom discharge through which the desired serving of the commodity, (granulated sugar, for example) is effected by the user manipulating certain valve devices that control the opening and closing of the discharge, the said present apparatus is adapted for being relatively fixedly supported at some desired place upon the table for being conveniently utilized, by diners at different parts of the table, as desired, in contradistinction to moving the apparatus about the table, from one user to another, as is the case in the practical application of the dispensing apparatus disclosed in my Patent #1,303,141 hereinbefore referred to.

The body portion 1, in my present invention, which constitutes the container for the material to be dispensed, is preferably of glass so that the material within the container may be readily observed, and the said body includes a hopper-like portion whose lower end terminates in a pendent circular neck 11. The upper end of the body or container, which is also circular, is provided at its uppermost edge with an external threadway 21 and with vertical oppositely disposed guides 31, the purpose of which will presently appear.

The container 1 is firmly seated within a suitable base, the construction of which will be clearly understood from the drawings, by reference to which it will be understood that the said base, which is preferably of spun metal, includes an upper hopper-like end 2, that merges with an annular collar-like portion 2ª that snugly fits the pendent neck 11 of the container, while the hopper-like end 2 snugly receives the correspondingly shaped portion of the container 1.

The collar 2ª of the base merges with a globular-like portion 2ᵇ which constitutes the inside portion of the supporting base, whose lower end is restricted and terminates in a discharging nozle 2ᵈ the lower edge of which engages and is braced by a flange that surrounds the opening 23ᶜ in the bottom plate 23 of a sub or outside base member 18. The upper end of the base member 18 terminates in a substantially semi-spherical portion 18ᶜ that snugly engages and is fixedly attached to the globular portion 2ᵇ of the inside base portion, as shown.

A bridge member 13 is secured within the globular portion 2ᵇ and it has a central key hole slot 13ª through which passes the lower end of the plunger rod 10 that carries the discharge outlet controlling valve.

Figure 2:
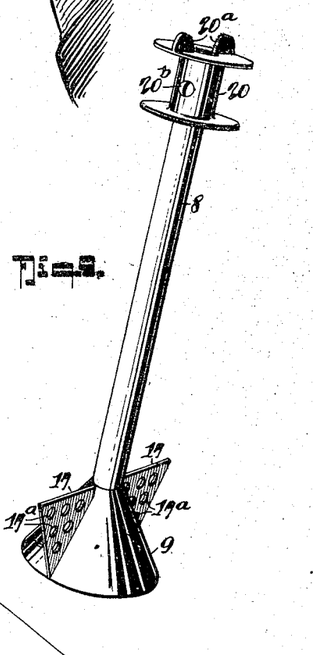
Figure 2 is a vertical longitudinal section of the apparatus, the oppositely movable and coacting valve devices being illustrated at the normal position, the discharge outlet being closed.
Figures 2, 4, 13, 14:
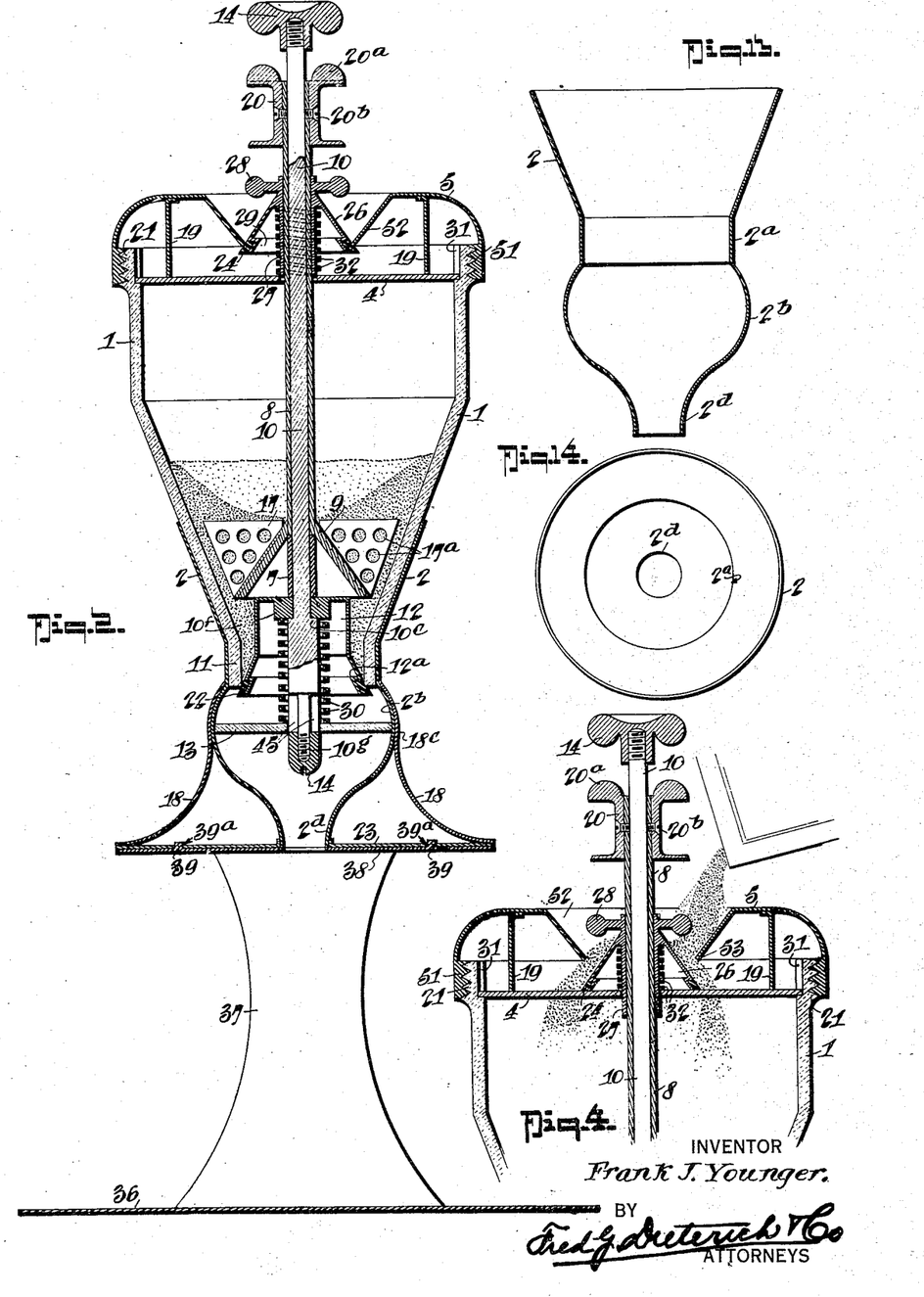

The outlet control valve 12, before mentioned, is of stout sheet metal, and has an inverted cup shape, with the lower portion provided with two flaring flanges 12ª—12ᵇ that form a bearing rim for receiving the ring valve disk 22 which, in practice, is of a rubber composition sufficiently hard to withstand wear and yet pliable enough to effect a tight contact with its seat to keep moisture from entering past the said valve 12 when it is closed against its seat, as is clearly shown in Figure 2.

The discharge closure valve 12 is relatively fixedly held on the lower end of the plunger rod 10 and the lower end of the said rod has an enlarged diameter whereby to provide a shoulder or seat 10ᶜ for engaging the enlarged head portion or boss 10ᶠ formed on the inverted cup-like valve 12 and against which it is firmly held by a tubular washer 7 that fits around the plunger 10, engages the closure control valve 12 and the feed control, fustro conical shaped, valve 9, as is best shown in Figures 2 and 3 of the drawings.

The lower end of the plunger rod has a threaded pintle 10ᵍ that passes through the key hole slot in the bridge piece 13 and it is adapted for receiving a screw cap 14 that engages the under side of the bridge piece 13 and holds the plunger rod to its operative conection.

The discharge control valve 12 is held up against its seat (the lowermost inner edge of the pendent neck of the glass container) by tension of a coil spring 30 that fits around the lower enlarged end of the plunger rod 10.

The spring 30 at the lower end seats on the bridge 13 and its upper end engages the boss 10ᶠ, before mentioned.

Figure 1:
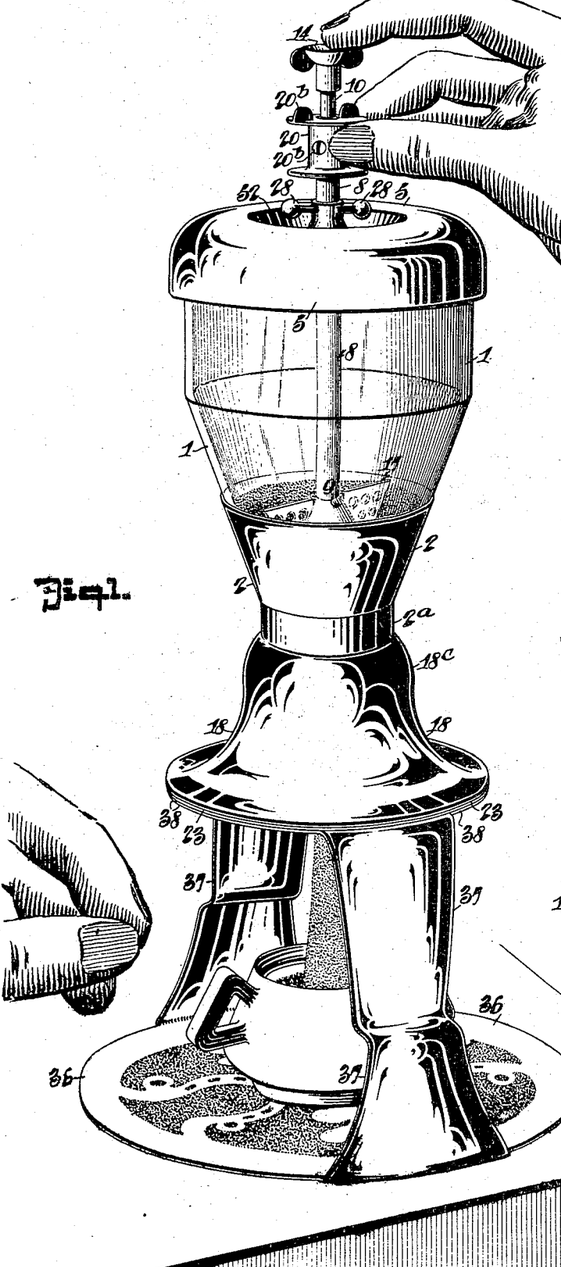
Figure 1 is a perspective view of my improved dispensing apparatus and illustrates a practical application thereof.

As in my patented dispensing apparatus mentioned, a cutoff valve 9 is provided which cooperates with the discharge control valve 12 and in my present construction, the valve 9, is of frusto conical shape and it is welded or otherwise attached upon the lower end of a tubular valve rod 8 whose upper end when the parts are operatively connected, as in Figures 1, 2 and 3, extends above the top closure or cap 5 and carries, at the said upper end, a finger grip 20 that is provided with wing portions 20ª to facilitate turning the members 8 and 9, the purpose of which will presently appear. The finger grip 20 is attached to the tubular member 8 by screws 20$^b$, as is clearly shown in the drawings.

An opposite pair of triangular shaped stirrer wings 17—17 is attached to the valve 9 to move therewith in vertical or rotary directions, and each of the said wings 17—17 is provided with a number of circular apertures 17$^a$.

The purpose of the wings 17 is to stir or agitate the granular contents of the container and prevent the contents that are being dispensed from clogging the valve 9 and from bridging or arching over the discharging portion of the container, it being apparent, from the drawings, that the wings 20$^a$—20$^a$ on the finger grip 20 provide convenient means for imparting rotation to the valve 9 and its attached wings 17 when it is desired to break up any tendency of the material to clog or pack at the discharging parts of the container.

Cooperative with the container 1 is a combined material infeeding means and top closure for the said container 1, which comprises a cap 5, of spun metal, that includes a pendent internally threaded rim 51 to provide for conveniently securing the cap 5 onto the upper threaded end of the container, as shown.

19—19 designate a pair of oppositely disposed vertical metal braces or strips, pendent from the crown of the cap 5 and adapted to straddle the opposite ends of a bridge or cross member 4, that constitutes a brace for the upper parts of the valve rods 8 and 10, that pass therethrough as shown to thereby hold same to its operative position within the head of the container body 1.

The ends of the member 4 fit down into and interlock with the opposite vertical grooves 31 in the top of the container 1.

52 designates a central hopper-like trough formed by shaping the cap top 5, as shown. The said trough has a restricted bottom opening 53 through which the material, to be dispensed, passes into the container during the operation of filling the same.

26 designates what I term "the filling valve" and it is also of frusto conical shape, and is an attached part of the tube 27 that fits around the adjacent part of the tubular valve stem 8.

Tube 27 has a finger portion 28 for pressing the valve 26 down away from its seat when it is desired to open the filling trough to the container 1.

Valve 26 has an annular rim seat 29 onto which is fitted a ring washer 24, made of a composition like the valve 22, before mentioned.

The valve washer 24 is held in the upwardly thrust or closure position by a tension spring 32 that fits around the tube 27, seats at its lower end on the bridge member 4, and at its upper end bears against the valve 26.

As hereinbefore noted, my present type of dispensing apparatus is intended for being held, relatively stationary, at a desired position on the table and is adapted for measuring out the desired amount of sugar or other material and discharging it into a cup or other receiver that is held in position under the apparatus as the user manipulates the apparatus, for delivering a desired quantity of the material within the container.

For such purposes, my present invention includes a standard or brace member upon which the dispensing apparatus is removably mounted with its discharge outlet sufficiently elevated to permit of positioning the cup or other food holder, for receiving the dispensed charge.

The standard or brace shown is shaped up from a stiff metal blank 35 that includes a circular base 36 and a pair of oppositely projected brace members 37, which, when bent to shape are curved as indicated in Figure 1.

At the outer ends the members 37 merge with semi-circular portions 38 that have struck up pin portions 39 adapted for interlockably engaging apertures 39$^a$ in the base 23 of the apparatus, as clearly shown in Figures 2 and 3 of the drawings.

The circular base portion 36 of the standard, in practice, is suitably ornamented, for example, as shown in Figure 16, to add interest to the apparatus.

From the foregoing description, taken in connection with the drawings, the details of construction and the general manner of manipulating the apparatus and its advantages will be readily apparent to the users of dining service appliances of the kind to which my invention relates.

The construction is such that the dispensing apparatus, per se, can be readily lifted onto or removed from the standard and the standard located at any desirable point along the table, the pins and apertures in the standard and in the base 23 tending to securely hold the dispensing apparatus against easy displacement, when using the device, which is done as follows:

It is to be understood that, in practice, the dispensing apparatus is adapted for discharging a given quantity of the commodity to be served, as before mentioned, a heaping teaspoonful of sugar, since such amount is usually contained between the two valves 9 and 12, or in greater or lesser amounts as may suit the requirements of the user.

With my improved construction of dispensing apparatus the operation of taking from it (a teaspoonful or other quantity) of the granulated sugar held within the container, is accomplished in a positive way and in such a simple manner that any child, after once shown, can successfully accomplish the same.

When it is desired to work the apparatus, the user takes hold of the grip 20, on the upper end of the tubular valve stem 8, holding it between the thumb and the second finger of the hand and at the same time places the first or index finger on the head 14 of the valve rod 10 and by pushing down on the said member 14 lowers the valve 12 from its closed position, and provides for the escape of the material from the container 1. While working the plunger or valve rod 10 by the alternate pushing down with the finger and the spring return, any quantity of the contents of the container can be obtained, from a sprinkling, to the complete emptying of the container, so long as the valve 9 is held to its up or open position.

When a predetermined quantity of the material is desired, (a teaspoonful) the user, as he presses down on the member 20 forces the valve 9 down until it seats, onto the restricted passage $x$ at the bottom of the container, as shown in Figure 3, which stops further outflow from the container until the valve 9 and its stem are again moved upwardly, it being understood that the downward movement of the valve tube 8 and its attached cutoff valve 9, carries with it the discharge valve 12 by reason of the relation of the washer member 7 and the boss $10^f$ with the said valve 9 and thereby opens the discharge valve 12 while the cutoff valve is being closed and in this manner discharges only so much sugar as fills the space between the two cooperating valve members. Should, at any time, the material tend to clog in its outflow, it can be instantly agitated or stirred to overcome such condition by rotating the tubular stem 8 and the valve 9 and its attached blades 17 through proper manipulation of the finger grip 20.

It is obvious that the construction and operation of the parts in my improved dispensing apparatus provides for causing a stream of granulated material to flow therefrom, provided that said material is especially adapted for use in an apparatus such as stated, and the said outflow can be practically continuous so long as the material remains within the container and the mechanism properly operated. Also it is obvious that a small, predetermined quantity may be dispensed at the will of the operator.

The plunger rod 10, with its head 14, is neutral in its action when individually operated and fulfils its function independent of the movement of the finger grip or head 20 on the tubular valve stem 8.

By pressing the plunger rod 10 down, as far as it will go, (its downward movement being limited by the valve 12 seating against the bridge piece 13) and holding the said plunger rod and its valve down under finger pressure to such position, the container 1 will empty in a steady stream and in short order, since the amount withdrawn from the container is absolutely under control of the finger, as indicated in Figure 1,—assuming of course, that the member 20 and its attached valve 9 are held up from their contents cutoff position, as shown.

When it is desired to fill the container, it is only necessary to press down the portion 28 to hold the valve 26 away from its seat and against the tension of the spring 32 that shifts the said valve 26 back to the closing position.

Figures 5, 10, 11, 17:
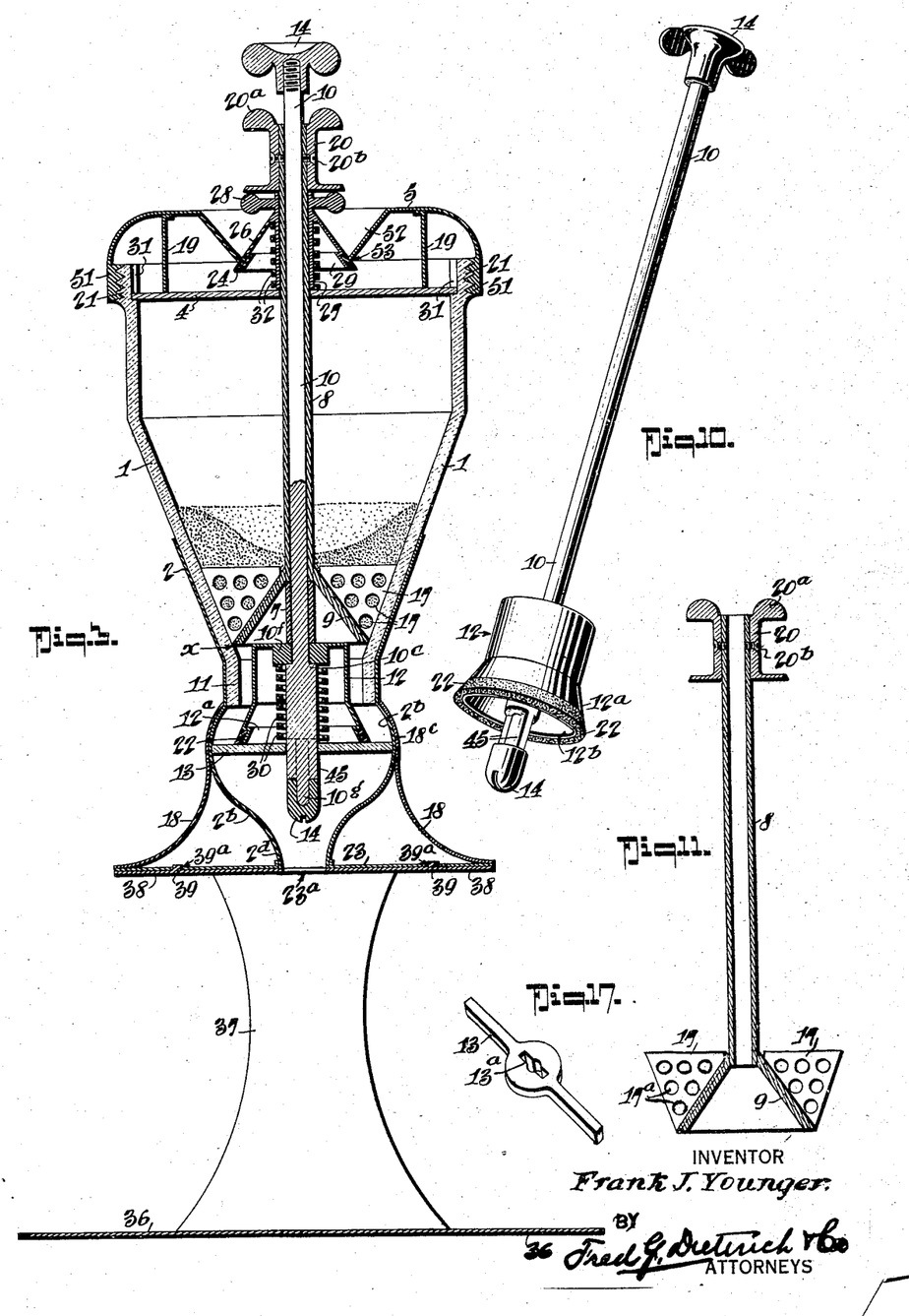
Figure 5:
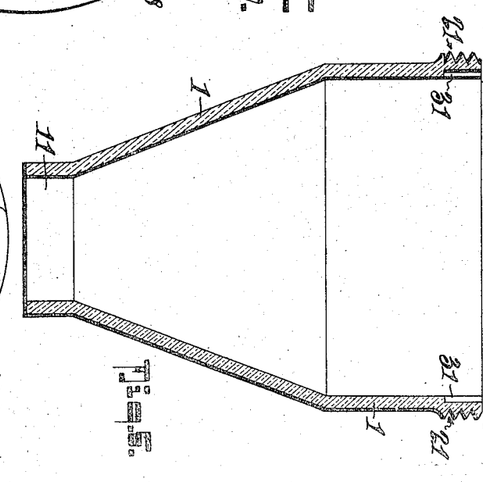
Figure 6:
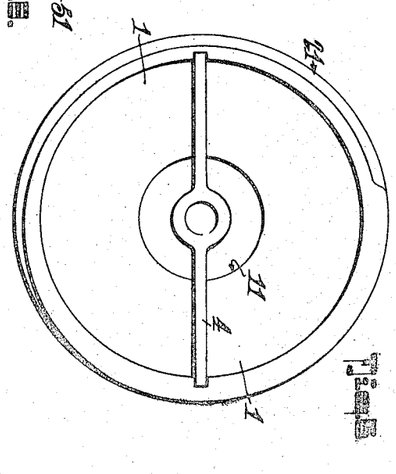
Figure 6 is a plan view of the body portion that constitutes the material container.
Figure 7:
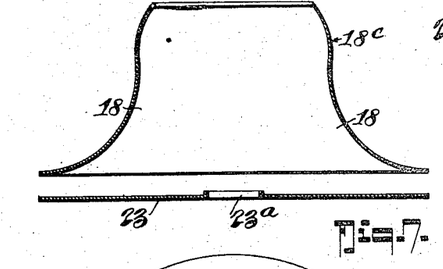
Figures 7 and 7ª illustrate in section and in plan view respectively, the metal base member that has the discharging outlet.
Figure 7A:
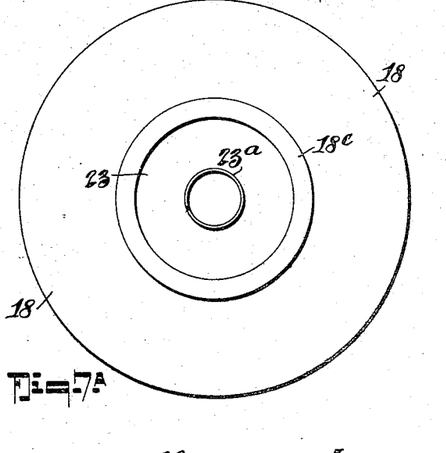
Figure 8:
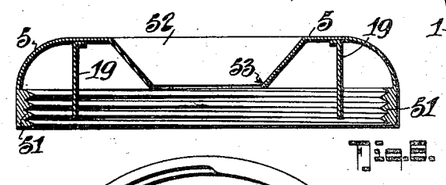
Figure 8A:
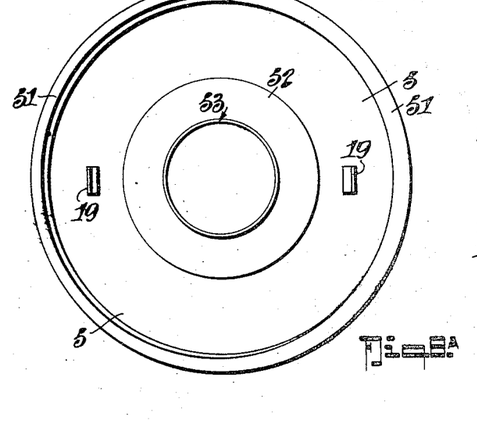
Figure 12:
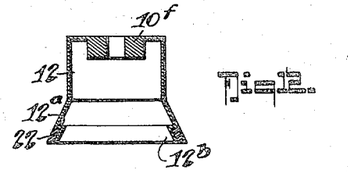
Figures 12 and 12ª are section and plan views respectively, of the discharge control valve.
Figure 12A:
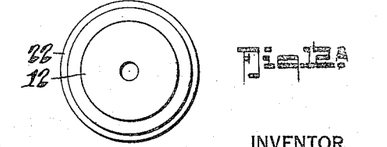
Figure 14:
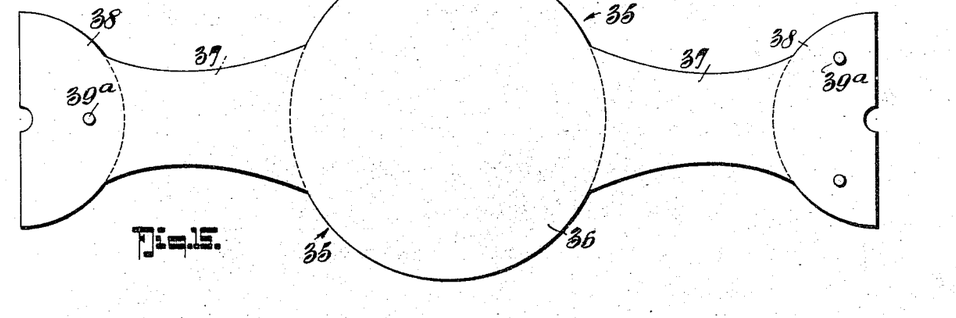
Figure 14 is a plan view of the inside base portion of the apparatus.
Figure 15:
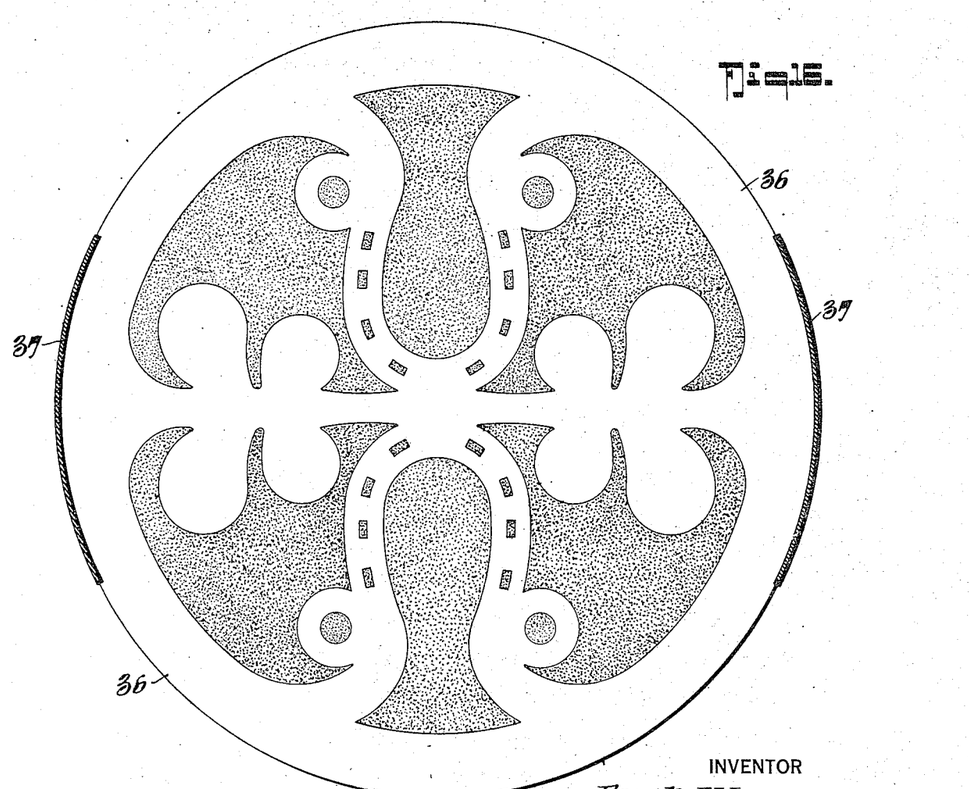
Figure 15 is an inverted view of the metal blank that is shaped up to form a standard.

As the rotation of the finger grip 20 and the tubular stem 8 may possibly disturb the rod 10 and the valve 12, if otherwise constructed, the larger or lower end of the said rod 10 has that portion thereof immediately at the threaded stem $10^g$ shaped to form ribs 45 for fitting the opposite elongations of the key hole in the bridge member 13, as shown in detail in Figure 17, such connection positively holding the valve 12 and its rod 10, from turning when the stirrer or agitating means is actuated by turning the finger grip 20, as before stated, it being understood that while the plunger rod 10 is thus held from rotation it is free to move vertically through the bridge piece 13, in one direction by finger pressure and in the other direction by the tension of the spring 30.

The operation of filling the container is simple, since to do so, it is only necessary to straddle two fingers around the tube 8 and press down evenly on the member 28 at the top of the tube 27, pressure being exerted until valve 26 rests against the guide bridge 4, and when the valve 26 is thus opened, pour the material (sugar) into the container and fill to a point below the rubber washer 21, and then release the fingers from the member 28, which permits the spring 32 to return the valve 26 to its normally closing position, it being understood that when pressing down on the filling valve 26 the other valves 9 and 12, with their attached members, remain neutral they being sustained at their normal position (Figure 2) by the tension of the spring 30 which, in practice, exerts sufficient pressure to oppose any possible frictional action that might tend to interfere with the proper setting of the valves 9 and 12.

It should be here mentioned, in my present construction of sugar dispensing apparatus, special fitting of the control valves and their actuating means have been provided to meet the requirements for evacuating a material (granulated sugar) that is more or less influenced by temperature. The valves in the present arrangement, are located and operate outside of the neck of the container, through which the material discharges, and thereby causes them to work more freely, since no sugar can be caught between them and choke the action of the said valves, a condition possible in the practical use of the valve devices, when arranged as in my patented apparatus mentioned.

The parts embodied in my dispensing apparatus are capable of being readily assembled for use and easily taken apart for cleaning, etc.

The separation of the parts is effected as follows: The apparatus, per se, is lifted off the bottom standard or base and its screw cap 14 is then removed from the plunger rod 10.

The container body, and its base are then separated by removing the base members 21, 18 and 23, which disengage the bridge 13 and the rod 10. The lower spring 30 will then come off, and by turning the body upside down the valves 9 and 12 will automatically drop down and rest against the member 4 of the cap or top closure devices with which the filling valve cooperates. The cap 5 is then unscrewed from the container 1; the operation of disconnecting the remaining parts being obvious.

What I claim is:

1. In a dispensing apparatus of the character stated, a container having a pendent discharging neck, a discharging means including a control valve that normally closes against the underside of the lower edge of the discharging neck, a cutoff valve adapted for being closed against the inlet end of the discharging neck and spaced apart from the other valve, and means for individually actuating the said valves.

2. In a dispensing apparatus of the character stated, a container having a pendent discharging neck, a discharging means including a control valve that normally closes against the underside of the lower edge of the discharging neck, a cutoff valve adapted for being closed against the inlet end of the discharging neck and spaced apart from the other valve, means for individually actuating the said valves, the said means comprising controlling elements adapted for being manipulated with the fingers of one hand, the controlling element of one valve adapted for being finger actuated as the controlling element of the other valve is held neutral.

3. In a dispensing apparatus of the character stated, a container having a pendent discharging neck, a discharging means including a control valve that normally closes against the underside of the lower edge of the discharging neck, a cutoff valve adapted for being closed against the inlet end of the discharging neck and spaced apart from the other valve, means for individually actuating the said valves, the said means comprising controlling elements adapted for being manipulated with the fingers of one hand, the controlling element of one valve adapted for being finger actuated as the controlling element of the other valve is held neutral, the controlling means for the two valves being arranged to be actuated, one by the index finger and the other by the middle finger and thumb of the hand.

4. In a dispensing apparatus of the character described, a container having a discharging outlet in the bottom thereof, discharging means comprising relatively telescopically movable parts including a cutoff valve connected to one of the movable parts and a closure control valve connected to the other movable part, a finger controlled member attached to each movable part for shifting the parts in like direction whereby to open the discharge control for evacuating a part of the contents of the container and to move the cutoff valves to close off the outflow from the container through its discharge.

5. In a dispensing apparatus of the character described, a container having a discharge outlet in the bottom thereof, discharging means comprising relatively telescopically movable parts including a cutoff valve connected to one of the movable parts and a closure control valve connected to the other movable part, a finger controlled member attached to each movable part for shifting the parts in like direction whereby to open the discharge control for evacuating a part of the contents of the container and to move the cutoff valves to close off the outflow from the container through its discharge and a spring device for returning the movable parts to their normal position and restoring the discharge control valve to its closing position.

6. In a dispensing apparatus of the character described, a container having a discharge outlet in the bottom thereof, discharging means comprising relatively telescopically movable parts including a cutoff valve connected to one of the movable parts and a closure control valve connected to the other movable part, a finger controlled member attached to each movable part for shifting the parts in like direction whereby to open the discharge control for evacuating a part of the contents of the container and to move the cutoff valves to close off the outflow from the container through its discharge, the cutoff valve being rotatively mounted with respect to the other valve, and means attached to the said cutoff valve for stirring or agitating the contents within the container when the cutoff valve is rotated and a finger grip device at the top of the apparatus for effecting the rotation and plunging action of the cutoff valve.

7. The combination with a dispensing apparatus in which is embodied a container having a discharge, members normally tending to close the said discharge, and means for adjusting the said members to open the discharge, the said means including an element extended outside of the container and adapted to be finger pressed to effect evacuation from the container; of a standard for supporting the dispenser with its discharge sufficiently elevated to admit of placing a vessel beneath it to receive the discharge therefrom, the said standard consisting of a sheet metal body having a base and opposing members bendable to and constituting uprights and whose ends terminate in horizontal portions that constitute a rest for the bottom of the dispensing apparatus, the said horizontal portions and the bottom of the apparatus having engaging portions for interlockably connecting the apparatus with the standard.

8. In a dispensing apparatus of the class described, a container having a discharge, means cooperative with the said discharge including a closure valve, means tending to normally hold the valve to its closing position against the under edge of the discharge, a plunger device having a member external of the container adapted, when finger pressed, to move the closure valve from the aforesaid container discharge, a second plunger valve normally held to the open position by the means that hold the discharge regulating valve to the closed position, a finger grip device cooperative with the said second plunger valve adapted for moving the said second valve to cut off the feed of the material from the container to its discharge, whereby to provide for a predetermined amount of the material being discharged from the container, the said second plunger valve including a tubular stem that extends above the top of the container to which the finger grip is attached, the said tubular stem telescopically engaging the plunger device for the first valve.

9. In a dispensing apparatus of the class described, a container having a discharge in the bottom, means cooperative with the said discharge including a closure valve, means tending to normally hold the valve to its closing position against the under edge of the discharge, a plunger device having a member external of the container adapted when finger pressed, to move the closure valve from the aforesaid container discharge, a second plunger valve normally held to the open position by the means that hold the discharge regulating valve to the closed position, a finger grip device cooperative with the said second plunger valve adapted for moving the said second valve to cut off the feed of the material from the container to its discharge, whereby to provide for a predetermined amount of the material being discharged from the container, the said second plunger valve including a tubular stem that extends above the top of the container to which the finger grip is attached, the said tubular stem telescopically engaging the plunger device for the first valve, lateral wings carried by the said second valve for agitating the material within the container, the said finger grip for actuating the second valve being adapted for rotating the tubular stem, the valve, and the lateral extension on the valve.

10. In a dispensing apparatus of the class described, a container having a discharge outlet and discharging means including a valve, a tension device normally holding the valve to the closure position, a cutoff valve adapted to cooperate with the discharge outlet to limit the quantity discharged and having movement in direction with the discharge closing valve, finger grip devices for actuating the said valves to move together to effect closure action of both valves and for holding the cutoff valve up to its open position while the discharge closure valve is operated for effecting repeated evacuations from the container.

11. In a dispensing apparatus of the class described, a container having a discharge outlet, a discharge means including a discharge valve, a tension device tending to normally hold the valve closed against the lower edge of the discharge outlet, a plunger rod attached to the said rod that projects above the top of the container, a cutoff valve located over the container discharge, and means tending to normally hold the said cutoff valve to the open position as the discharge valve is at the closed position, a tubular stem connected to the cutoff valve telescopically that rotatably engages the plunger rod of the discharge valve, said tubular stem projecting above the top of the container, said stem and the rod it engages having finger engaging portions relatively disposed whereby the user can hold the grip for the tubular stem pressed upwardly to maintain the cutoff valve at the bent position and simultaneously depress the plunger rod for the discharge valve to evacuate the container, or for simultaneously pressing the tubular stem down with the said plunger rod to cut off the feed from the container as a predetermined quantity is evacuated from the said container.

12. In a dispensing apparatus which embodies a container having a discharge at one end, means operable from the exterior of the apparatus for effecting the opening and closing of the discharge, said container having an inlet at the other end, a closure valve for the said inlet, and means cooperative therewith for normally closing the said inlet valve, a cutoff valve operable within the container, means tending to normally hold the said cutoff valve at the open position, and elements cooperative with the cutoff valve and the inlet closure adapted, under finger pressure, to effect a simultaneous opening of the inlet valve and the closing of the cutoff valve whereby to adapt the container for receiving a new charge of material through its inlet.

13. In a dispensing apparatus which embodies a container having a discharge at one end, means operable from the exterior of the apparatus for effecting the opening and closing of the discharge, said container having an inlet at the other end, a closure valve for the said inlet, and means cooperative therewith for normally closing the said inlet valve, a cutoff valve operable within the container, means tending to normally hold the said cutoff valve at the open position, elements cooperative with the cutoff valve and the inlet closure adapted, under finger pressure, to effect a simultaneous opening of the inlet valve and the closing of the cutoff valve whereby to adapt the container for receiving a new charge of material through its inlet, the said elements including a vertically reciprocable stem to which the cutoff valve is attached and which is projected above the container, another tubular stem mounted on the first mentioned stem connected to and movable with the inlet closure valve and a finger pressed member on the first named stem adapted when depressed to engage the other stem and move with its cutoff valve to the closure position and simultaneously move the said inlet closing valve to the open position, and means for restoring the inlet valve to its normal or closing position when the aforesaid pressure is removed from the stems.

14. In a dispensing apparatus of the class described, a container having a restricted discharge in one end and a removable top having an inlet, a valve for the inlet that normally closes such inlet, a valve for the discharge and a cutoff valve for cutting off the outflow from the container to its discharge, finger actuated means for controlling the opening of the discharge closing valve and actuating means including a finger manipulated head for shifting the cutoff valve to its closing position and subsequently moving the inlet closure valve to its open position.

15. In a dispensing apparatus of the class described, a container having a restricted discharge at one end and including a top having a filling inlet, a cutoff valve for controlling the outflow from the container into its restricted discharge, a spring pressed valve normally closing the discharge from the container, a plunger cooperative with the discharge closing valve, a tubular stem telescopically engaging the said plunger, a spring closed valve that cooperates with the filling inlet, a tubular plunger connected with the said filling inlet closing valve that telescopically engages the tubular stem, the said tubular stem connecting with the cutoff valve that controls the outflow from the container, the several tubular members and the plunger each having a manipulated finger grip, the several grips being relatively arranged whereby the operation of manipulating the discharge and the container is adapted for being simultaneously or intermittently effected by the fingers of one hand.

16. In a dispensing apparatus of the class described, a container having a restricted discharge in the lower end thereof, and means for controlling the outflow from the container through the said discharge, a closure cap removably fitting upon the top of the container, an inlet opening in the said cap, a valve normally held closed against the said inlet opening and finger manipulated means for effecting the opening of the said inlet valve.

17. In a dispensing apparatus of the character described, the combination of a container having a discharge in the lower end, a closure valve for said discharge, a plunger rod to which the said valve connects, and a cutoff valve within the container for closing off the outflow from the container to its discharge; of a spring cooperative with both mentioned valves for holding the discharge valve closed and the cutoff valve to the open position, a tubular stem to which the cutoff valve is attached, the said stem rotatively and reciprocably engaging the plunger rod, and a finger manipulated member at the upper end of the stem and plunger rod for effecting downward movement to the rod and downward and rotative movement to the tubular stem.

18. In a dispensing apparatus of the character described, the combination of a container having a discharge in the lower end, a closure valve for said discharge, a plunger rod to which the said valve connects, and a cutoff valve within the container for closing off the outflow from the container to its discharge; of a spring cooperative with both mentioned valves for holding the discharge valve closed and the cutoff valve to the open position, a tubular stem to which the cutoff valve is attached, the said stem rotatively and reciprocably engaging the plunger rod, a finger manipulated member at the upper end of the stem and plunger rod for effecting downward movement to the rod and downward and rotative movement to the tubular stem, and means for holding the plunger rod from rotation.

19. In a dispensing apparatus of the character stated, a container having a restricted discharge, a closure valve adapted for engaging the lower end of the said discharge, a cutoff valve within the container adapted when shifted to cut off the outflow of the material within the container to its discharge, a single operative spring device that engages with the cutoff and the closure valve and tends to normally hold the cutoff valve to the open and the closure valve to the closed position, and finger manipulated means which include a plunger rod that joins with the closure valve, and a tubular stem that joins with the cutoff valve and independently shiftable for sustaining the cutoff valve to its open position as the discharge valve is being intermittently opened and closed and for moving the said cutoff valve to its material cutoff position when a predetermined charge is to be evacuated from the container.

FRANK J. YOUNGER.